United States Patent [19]
Zodrow et al.

[11] 3,945,466
[45] Mar. 23, 1976

[54] LUBRICATING DEVICE FOR ROLL SPINDLES

[75] Inventors: Bernhard Zodrow, Leichlingen; Milan Kovacev; Wolf Dietrich Stengritt, both of Dusseldorf; Rudolf Hopp, Berlin, all of Germany

[73] Assignee: G. Schwartz & Co., Dusseldorf, Germany

[22] Filed: Aug. 26, 1974

[21] Appl. No.: 500,338

[30] Foreign Application Priority Data
Aug. 24, 1973 Germany............................ 2342733

[52] U.S. Cl.................................... 184/7 A; 72/236
[51] Int. Cl.².......................................... F01M 1/06
[58] Field of Search...... 301/126, 131; 72/236, 237, 72/239; 184/7 R, 7 A, 6.28

[56] References Cited
UNITED STATES PATENTS

| | | | |
|---|---|---|---|
| 1,978,895 | 10/1934 | Clark | 72/236 |
| 2,010,211 | 8/1935 | Wood | 72/236 |
| 2,113,050 | 4/1938 | Iversen | 72/236 |
| 2,150,248 | 3/1939 | Rosenbaum | 72/236 |
| 3,603,070 | 9/1971 | Atwood | 184/7 A |
| 3,648,497 | 3/1972 | Long | 72/236 |
| 3,699,791 | 10/1972 | Eibe | 72/236 |

*Primary Examiner*—Richard C. Pinkham
*Assistant Examiner*—Marvin Siskind
*Attorney, Agent, or Firm*—Walter Becker

[57] ABSTRACT

A lubricating device for mounting on a spindle, such as a roll spindle, in which a split gear ring is mounted on the spindle and confined within a cover which has a pinion therein meshing with the gear ring and forming a lubricant pump therewith. The gear ring has axial hub portions thereon and there are bearings interposed between the cover and the hub portions rollingly supporting the cover on the hub portions. The cover is sealed to the hub portions and is held against rotation on the spindle.

16 Claims, 7 Drawing Figures

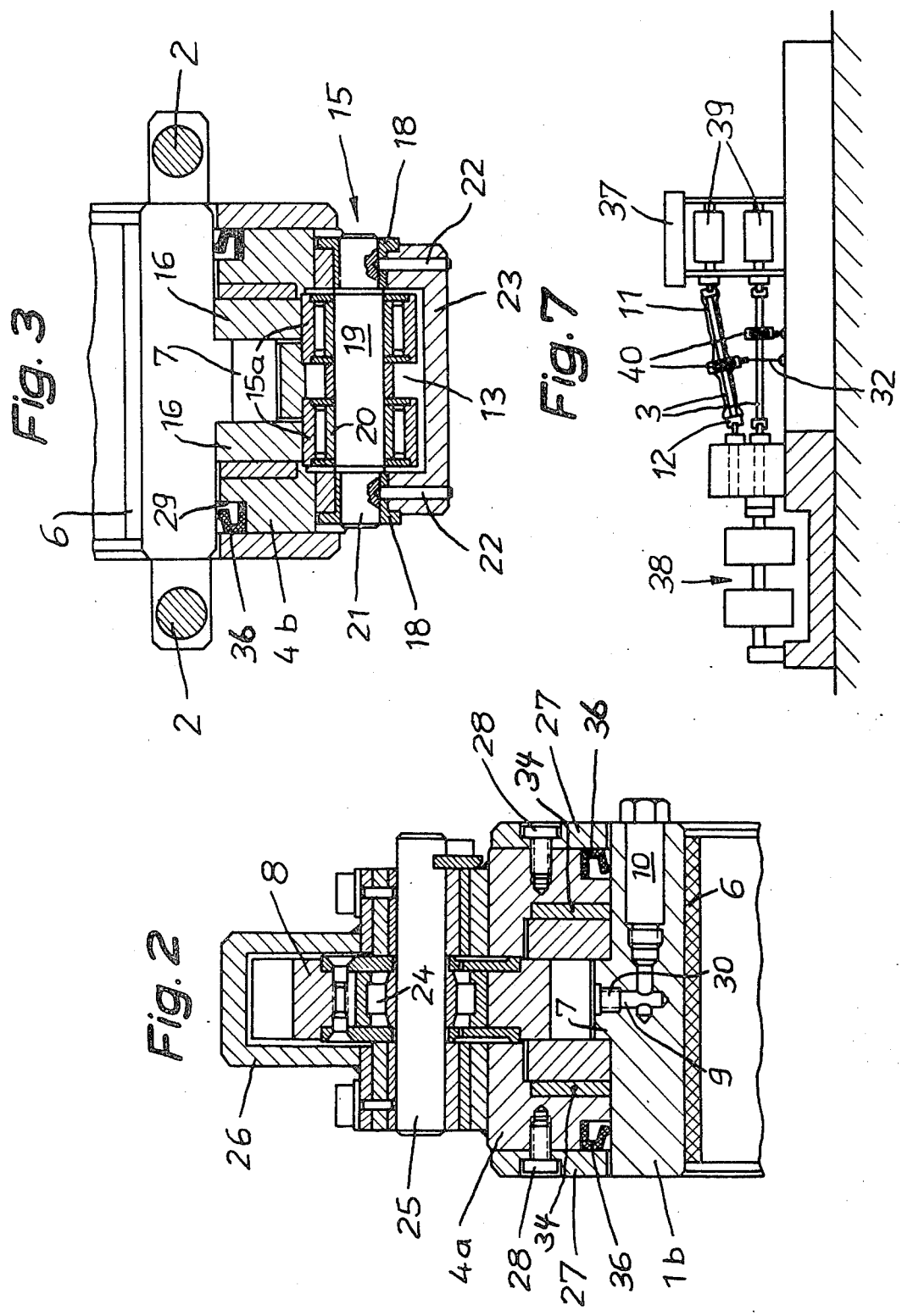

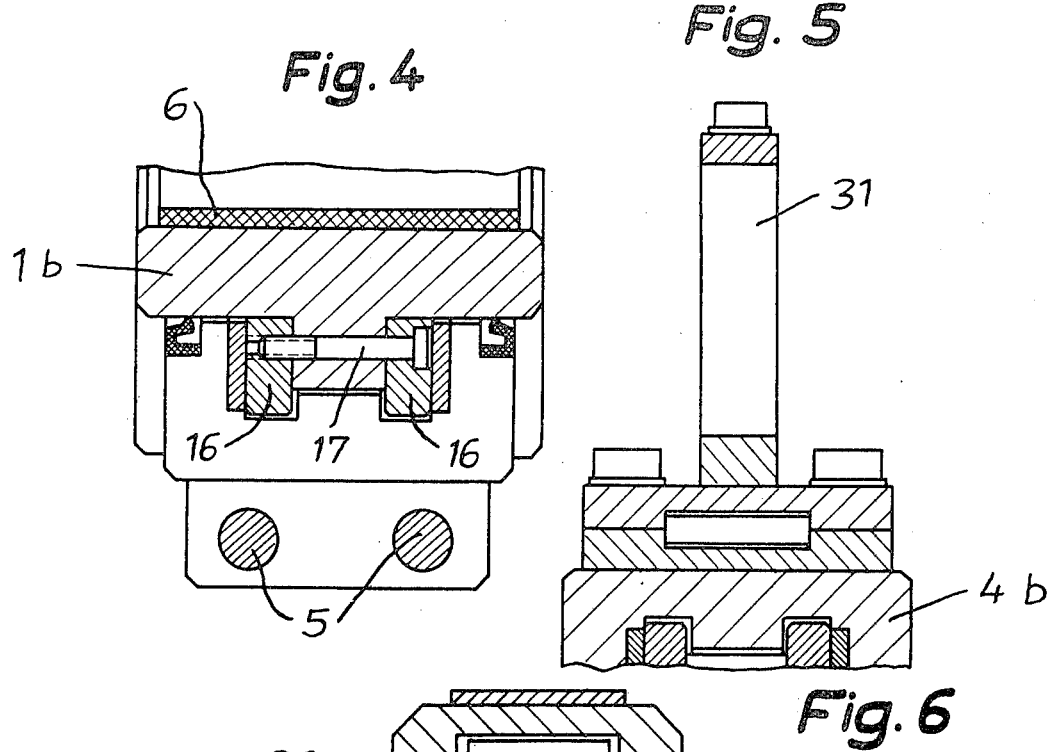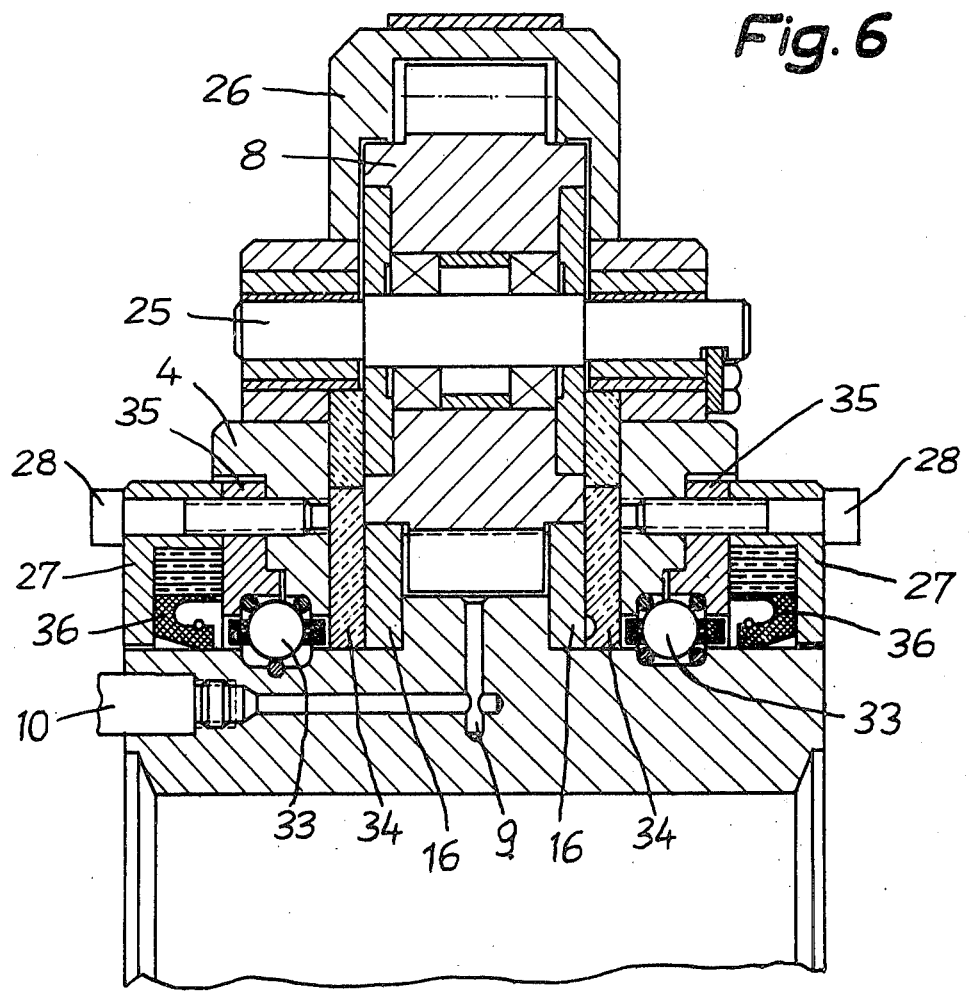

LUBRICATING DEVICE FOR ROLL SPINDLES

The present invention relates to a lubricating device for roll spindles of rolling mills with a pump comprising a gear ring and at least one pinion, said spindle having connected thereto a radially divisible hub with gear ring in the tooth spaces of which there are provided radially extending conveying bores leading into tap bores of the hub while the pinion meshing with the gear ring is mounted in a cover which is rotatable relative to the hub and is radially divisible, said cover having a U-shaped cross section and forming a chamber extending over the gear ring.

The joints of roll spindles of rolling mills have numerous circulating lubricating points which have to be continuously provided with grease. The fact that the lubricating points themselves circulate brings about a difficulty for the arrangement of the lubricating device and the feeding lines to the individual lubricating points. For purposes of solving this problem, two main designs for lubricating devices of the above mentioned type have become known and are described in German Pat. Nos. 1,602,170 and 2,123,557.

According to these known lubricating devices, the stationary cover is slidably mounted on the rotatable hub and partially rests by means of the pinion or pinions on the gear ring of the hub. The actual operation in practice of these known lubricating devices has proved that it is difficult to keep wear in the sealing gap between hub and cover within economically feasible limits. Inasmuch as the roll spindles located between a drive or transmission and a rolling mill may have a position varying from a horizontal position to a vertical position, also the lubricating devices must be operable in a correspondingly inclined position of said spindles. In this connection it has been found that an undue high wear occurs in the slide bearing between the cover and the hub, and in particular, at the seals, which high wear is caused by the high radial and axial load. It is not possible to prevent this wear by making the cover of a lighter material than the hub because a pairing of one material with a different material would even increase the wear. The heretofore known lubricating devices are no longer able to meet the occurring loads, especially those occurring at circumferential speeds exceeding 5 meters per second.

It is, therefore, an object of the present invention so to improve the heretofore known lubricating devices of the above mentioned type that the wear occurring between the cover and the hub can, even at greater circumferential speeds, exceeding 5 meters per second and in inclined installed position, be kept in economically permissible limits.

This object and other objects and advantages of the invention will appear more clearly from the following specification, in connection with the accompanying drawings, in which:

FIG. 2 shows a section taken along the line II—II of FIG. 1.

FIG. 3 illustrates a section taken along the line III—III of FIG. 1.

FIG. 4 is a section taken along the line IV—IV of FIG. 1.

FIG. 5 shows a section taken along the line V—V of FIG. 1.

FIG. 6 is a section through the upper portion of a modified arrangement of the lubricating device.

FIG. 7 is a diagrammatic view of a rolling mill illustrating the position of the lubricating devices on the roll spindles in conformity with the present invention.

Figure 1:
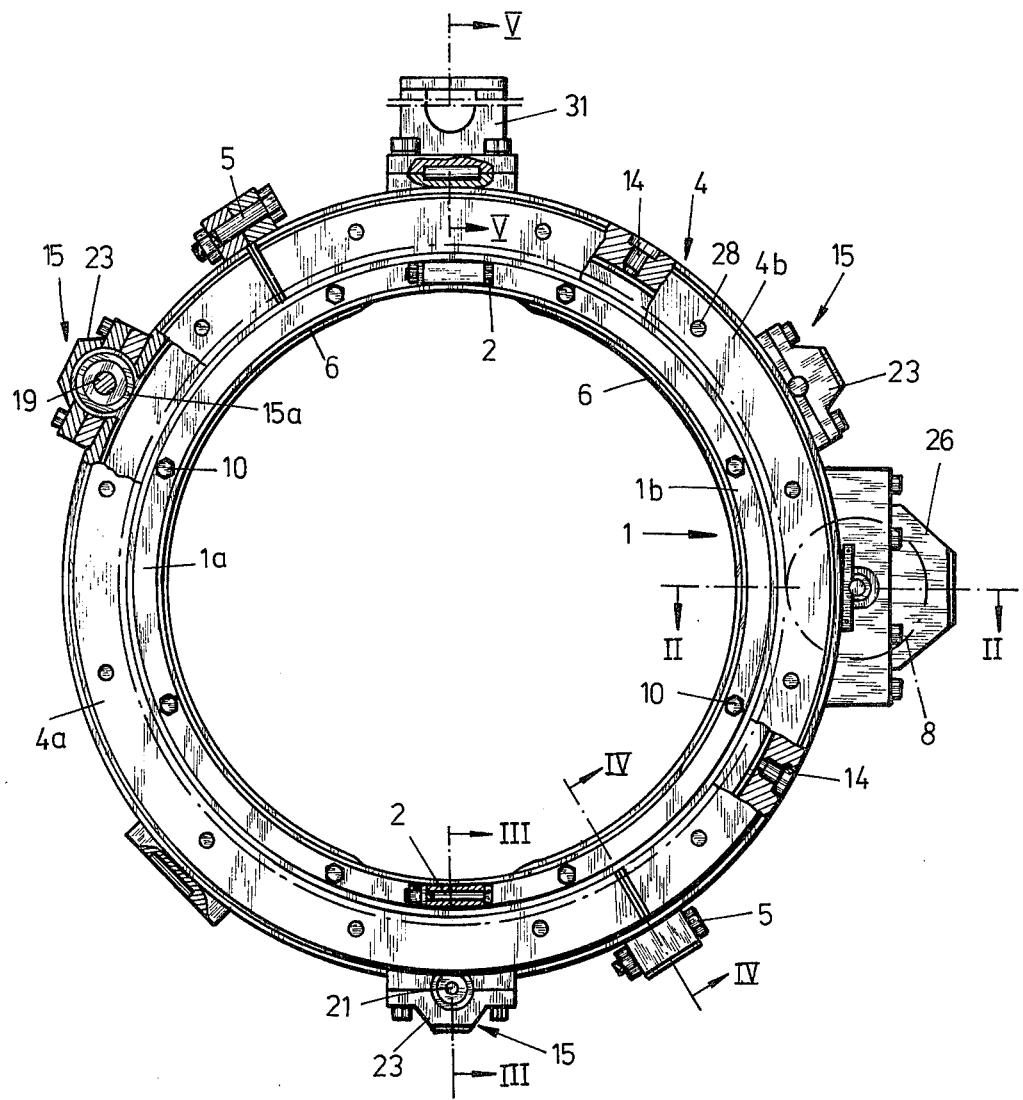
FIG. 1 illustrates a side view of a lubricating device according to the invention, partially in section.

The lubricating device according to the present invention is characterized primarily in that the cover is, on both sides of the gear ring, in a rolling manner, mounted on the hub. More specifically, the mounting of the cover in a rolling manner on the hub, is effected by means of at least three supporting roller pairs uniformly distributed over the circumference of the cover.

According to one specific embodiment of the invention, it has proved advantageous to provide side rings on both sides of the gear ring on which side rings the supporting rollers may roll. In order to be able properly to adjust the play between the supporting rollers and the side rings, it is expedient to arrange a supporting roller pair on a shaft which is radially adjustably mounted in the cover. The radially adjustable mounting may also consist of bearing pins arranged eccentrically.

The mounting of the cover with supporting rollers on the hub in conformity with the invention decreases the wear and brings about a considerably quieter running. The play of the tooth flanks between the conveying pinion and the gear ring on the hub may be adjusted for optimum purposes. The now rolling friction between cover and hub also brings about a considerably reduced heating up of the employed lubricants so that the original viscosity of the lubricant will be maintained and a better seal can be obtained. The rolling friction between cover and hub also makes it possible to make the cover of a considerably lighter material. For instance, the cover may be made of aluminum or die-cast aluminum, whereas the hub may be made of steel, die-cast iron, or sphaero-cast metal. This brings about a considerably simplification of the manufacturing process and a considerably decrease in cost thereof.

According to a further improvement of the invention, the basic problem in connection with a lubricating device for installation on nearly vertically extending roll spindles, which means in approximately horizontal operative position, is solved by mounting the cover with radially divided wire ball bearings on both sides of the gear ring on the hub in a rolling manner. The wire ball bearings are expediently inserted in the housing formed by the cover and by laterally extending radially divided bearing rings. In order to permit a precise adjusting, the bearing rings are expediently post adjustable and are connected by screws to the cover. According to this design, the lubricating device according to the invention has the advantage that the wire ball bearings will in a greatly inclined or approximately horizontal position of operation assure a very low wear in the guiding of the cover on the hub, while the play of operation between the pinion and the lateral rings will be retained.

With both embodiments, the lubricating device according to the invention has the advantage that now also the pinion which is relieved from any guiding or supporting function may be produced of synthetic material. Moreover, the tooth flank play may be reduced to an extent not possible heretofore.

Referring now to the drawings in detail, and FIGS. 1-5 thereof in particular, the lubricating device illustrated in FIGS. 1-5 consists primarily of a hub 1 with two radially divisible sections 1a, 1b which by means of screws 2 through the intervention of a roll spindle 3

(FIG. 7) are connected to each other to form a ring. The lubricating device furthermore comprises a cover 4 with two sections 4a and 4b which are likewise by means of screws 5 combined to form a ring.

On the inner side of the annular hub 1 are spacer members 6 by means of which the hub 1 is connected to the roll spindle 3. In the center of the hub there is provided a gear ring 7 with which a pinion 8 meshes which is journaled on the cover 4. In the tooth spaces of gear ring 7 there are provided radially inwardly extending bores 9 which lead into axially extending tap bores 10 with built in check valve. Conduits 11 (FIG. 7) may be connected to the tap bores 10 and lead to joints 12 (FIG. 7) of the roll spindles 3.

The cover 4 has a U-shaped cross section and together with hub 1 forms a chamber 13 which is adapted to be filled with a lubricant —grease—through bores 14 which are arranged ahead and behind the pinion 8 when looking in the direction of rotation of the pinion. The cover 4 is resting on side rings 16 by means of three supporting roller pairs 15 which are offset relative to each other by an angle of 120° and are mounted on the circumference of the cover 4. The side rings are connected to the gear ring by screws 17. The supporting rollers 15a are journaled by means of anti-friction bearings 20 on shafts 19 journaled in the cover 4 by means of bushings 18 and roll on the side rings 16. In order to be able to adjust the play between the cover 4 and the hub 1, there is provided at least one shaft 19 with eccentrically arranged bearing pivots 21 on which the shaft 19 can be fixed by threaded pins 22. The supporting roller pairs 15 are sealed toward the outside by housing covers 23.

The pinion 8 is by means of an anti-friction bearing 24 adjustably journaled on a shaft 25 which is arranged in a housing 26 connected to the cover 4. For purposes of laterally sealing, closure rings 27 are connected by screws 28 to the cover 4 while in a portion 29 of cover 4 there is inserted a lip sealing 36 engaging the hub 1.

The lubricant which is filled into the chamber 13 through bores 14 is pumped by the gears of pinion 8 through bores 9 and tap bores 10 with built-in check valve to the conduits 11, said conduits 11 leading to the various lubricating points. In order to be able at higher speeds to prevent a flowing back of the lubricant into the chamber 13, an additional check valve 30 is built into each bore 9.

At the outer circumference of cover 4 there is arranged a holding device 31 which during the operation is connected to an anchoring system 32 (FIG. 7) According to the design illustrated in FIG. 6, the cover 4 is journaled on hub 1 by means of two wire ball bearings 33. This mounting has the advantage that it can better absorb the occurring axial loads, especially when the lubricating device is horizontally arranged on the vertically extending roll spindle 3. With this design, between the cover 4 and the side rings 16 there are provided radially divided starting discs 34 of bronze. A seal in the form of a lip seal 36 is provided outside the wire ball bearings 33 between the bearing rings 35 and the closure rings 27 which are connected from the outside by screws 28 to the cover 4.

For purposes of illustrating the location of the lubricating device 40, FIG. 7 shows a roller mill 37 with a drive 38 and rollers 39. The roll spindles 3 are located between the transmission 38 and the rollers 39 in differently inclined position. The roll spindles 3 as well as the lubricating points on the joints 12 rotate, whereas the devices for the feeding of the lubricant and the cover 4 with bores 14 for filling the lubricant into the chamber 13 are standing still because they are held on the holding device 31 by means of the anchoring system 32.

It is, of course, to be understood that the present invention is, by no means, limited to the specific showing in the drawing, but also comprises any modifications within the scope of the appended claims.

What is claimed is:

1. A lubricating device, especially for roll spindles, comprising; a radially split gear ring adapted for mounting on a roll spindle for rotation therewith and having axial hub portions, a pinion meshing with said gear ring and forming a pump therewith, lubricant passages communicating with at least some of the tooth spaces of the gear ring and leading axially through at least one of said hub portions, a radially split cover which is "U" shaped in cross section fitted about said gear ring and sealingly engaged said hub portions, said cover having an opening for accommodating said pinion, housing means enclosing said pinion and connected to said cover, means enclosing said pinion and connected to said cover, means for holding said cover against rotation during rotation of the spindle while permitting lateral movement of the cover and spindle in unison, and bearing means supported by said cover and rollingly supporting said cover on the said hubs of said ring gear while holding the cover against lateral movement on the spindle.

2. A lubricating device according to claim 1 in which said bearing means comprises at least three supporting roller means carried by said cover in circumferentially distributed relation and rollingly supported on said hub portions.

3. A lubricating device according to claim 1 which includes a ring on each hub portion adjacent the said ring gear, said bearing means including pairs of coaxial rollers carried by said cover in circumferentially distributed relation and rollingly engaging the radially outer peripheries of said rings.

4. A lubricating device according to claim 1 in which said bearing means includes rollers distributed circumferentially in said cover and support shafts therefor, and means for radially adjusting at least one of said shafts in said cover.

5. A lubricating device according to claim 4 in which said means for radially adjusting said one shaft in said cover comprises angularly adjustable eccentric bushings in the cover supporting the ends of the said shaft.

6. A lubricating device according to claim 5 which includes means for locking said bushings in angularly adjusted positions in said cover.

7. A lubricating device according to claim 1 in which said bearing means comprise ball bearings.

8. A lubricating device according to claim 7 in which said ball bearings comprise inner race means on said hub portions and outer race means on said cover and holes rollingly engaging said race means.

9. A lubricating device according to claim 7 in which said hub portions comprise radially outwardly opening annular grooves to accommodate said ball bearings on the radially inward side thereof, said cover comprising radially inwardly opening annular grooves to accommodate said ball bearings on the radially outward side thereof.

10. A lubricating device according to claim 9 which includes wires in said grooves forming the race surfaces on which the balls of said ball bearings roll.

11. A lubricating device according to claim 9 which includes radially split ring members mounted on said cover from the outside and forming the axially outer portions of the said annular grooves therein.

12. A lubricating device according to claim 11 which includes screws adjustably connecting said ring members to said cover.

13. A lubricating device according to claim 1 in which at least the hub portions of said ring gear are formed of steel while said cover is formed of aluminum.

14. A lubricating device according to claim 1 in which said ring gear is formed of metal and said pinion is formed of a synthetic material.

15. A lubricating device according to claim 1 which includes a ring member on each hub portion, each ring member engaging a respective side of said gear ring and extending radially outwardly beyond the outer periphery of the gear ring and engaging a respective side of said pinion thereby to confine the pumping region formed by said gear ring and pinion at the axial ends of the pumping region.

16. A lubricating device according to claim 5 which includes lubricant supply means connected to the space inside said cover in at least one circumferential region of the cover circumferentially spaced from said pinion.

* * * * *